(12) United States Patent
Oomori

(10) Patent No.: US 7,690,028 B2
(45) Date of Patent: Mar. 30, 2010

(54) IMAGE COMMUNICATION APPARATUS

(75) Inventor: Akira Oomori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1077 days.

(21) Appl. No.: 10/835,354

(22) Filed: Apr. 28, 2004

(65) Prior Publication Data
US 2004/0223183 A1 Nov. 11, 2004

(30) Foreign Application Priority Data
May 9, 2003 (JP) ............................. 2003-132138

(51) Int. Cl.
*G06F 15/16* (2006.01)
(52) U.S. Cl. .......................................................... 726/9
(58) Field of Classification Search ................ 713/182, 713/185, 184; 726/9, 20
See application file for complete search history.

(56) References Cited

U.S. PATENT DOCUMENTS

| 6,199,114 | B1 * | 3/2001 | White et al. ................ 709/229 |
| 2001/0032243 | A1 | 10/2001 | Ogawa | |
| 2002/0129259 | A1 * | 9/2002 | Chatterton .................. 713/185 |
| 2003/0074411 | A1 * | 4/2003 | Nale ........................... 709/206 |
| 2003/0088780 | A1 * | 5/2003 | Kuo et al. ................... 713/185 |

FOREIGN PATENT DOCUMENTS

| JP | 55-115157 | 9/1980 |
| JP | 2001-298577 A | 10/2001 |
| JP | 2003-008822 A | 1/2003 |

OTHER PUBLICATIONS

A Smartcard-based Framework for Secure Document Exchange Shugn-Huang Yang, Shy-Ming Ju, T.R.N. Rao Dept. of Information Management, National Kaoshsiung First University of Science and Technology, Yenchao, Kaosiung, Taiwan 824, R.O.C. CACS, University of Southwestern Louisiana, Lafayette, Louisiana 70504-4330, U.S.A. Published IEEE 1998.*

* cited by examiner

*Primary Examiner*—Ellen Tran
(74) *Attorney, Agent, or Firm*—Canon U.S.A. Inc., I.P. Division

(57) ABSTRACT

An image communication apparatus includes a central processing unit for verifying at least a password, entered by an operator, against authentication information stored in an external storage to authenticate the operator. When the operator is authenticated, sender information corresponding to the operator is read from the external storage. When the sender information is inappropriate, the image communication apparatus prevents the operator from transmitting image data.

8 Claims, 7 Drawing Sheets

FIG. 6A

```
IC CARD 1
LOGIN NAME     : yamada
PASSWORD       : yamada_pass
┌─────────────────────────────────────┐
│ SENDER INFORMATION 1                │
│ NAME          : YAMADA TAROU        │
│ ┌─────────────────────────────────┐ │
│ │ SECRET KEY OF "YAMADA TAROU"    │ │
│ └─────────────────────────────────┘ │
└─────────────────────────────────────┘
```

FIG. 6B

```
IC CARD 2
LOGIN NAME     : suzuki
PASSWORD       : suzuki_pass
┌─────────────────────────────────────┐
│ SENDER INFORMATION 2                │
│ NAME          : SUZUKI KOUJI        │
│ ┌─────────────────────────────────┐ │
│ │ SECRET KEY OF "SUZUKI KOUJI"    │ │
│ └─────────────────────────────────┘ │
└─────────────────────────────────────┘
```

FIG. 6C

```
IC CARD 3
LOGIN NAME     : koizumi
PASSWORD       : koizumi_pass
┌─────────────────────────────────────┐
│ SENDER INFORMATION 3                │
│ NAME          : KOIZUMI ICHIROU     │
│ NO SECRET KEY                       │
└─────────────────────────────────────┘
```

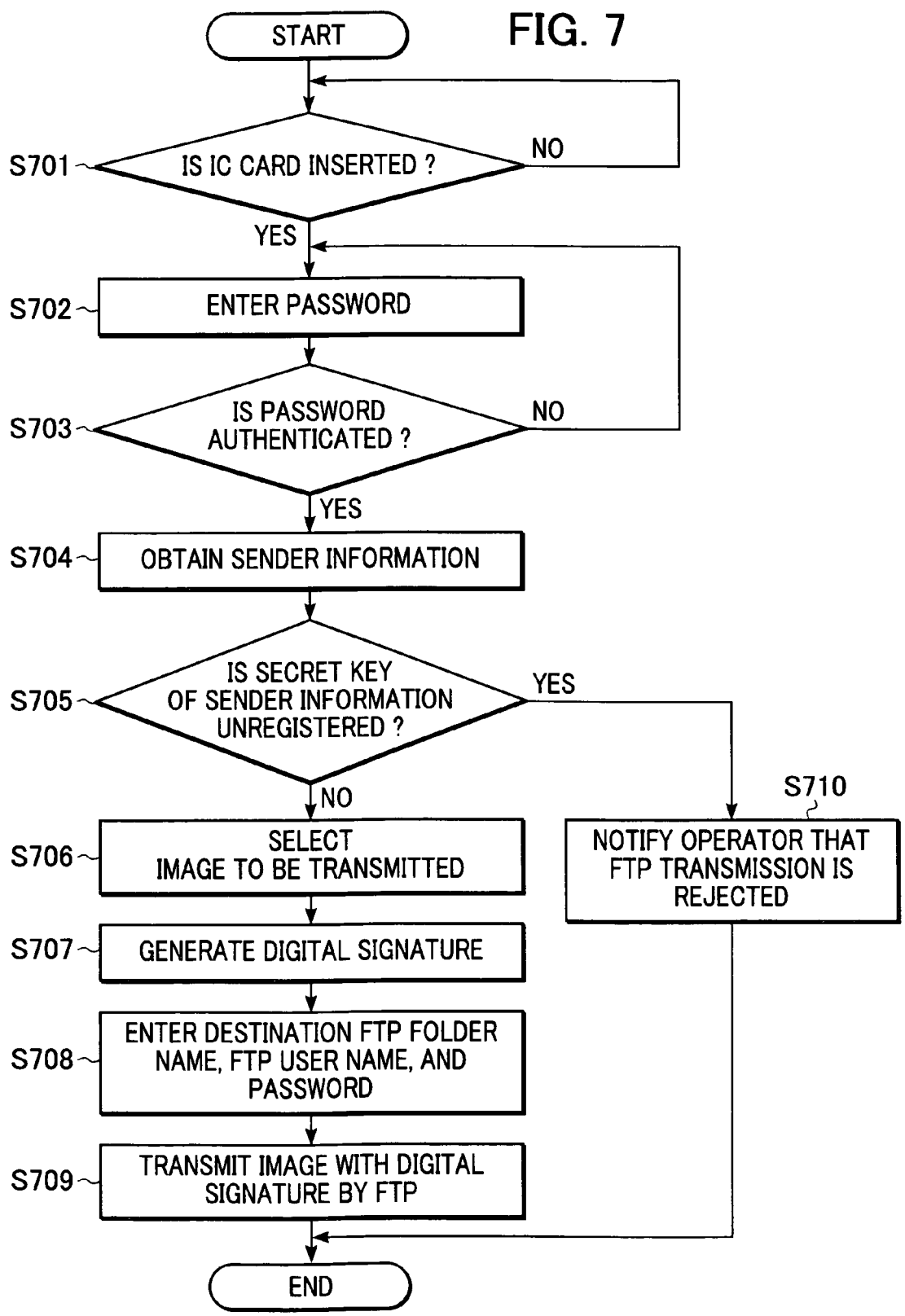

IMAGE COMMUNICATION APPARATUS

BACKGROUND OF THE INVENTION

1. Field of the Invention

The present invention relates to image communication apparatuses and, more particularly, to an image communication apparatus and method for transmitting image data, designated by an operator, to the outside.

2. Description of the Related Art

Apparatuses for scanning an image and transmitting the scanned image and apparatuses for transmitting a stored image each practically use a function of authenticating an operator according to an authentication procedure and permitting only the authenticated operator to operate the apparatus.

In the above-mentioned apparatuses, after the operator is authenticated according to the authentication procedure, the operator generally sets sender information by himself or herself. The operator needs the sender information in image transmission.

Some of the above-mentioned apparatuses also include a function of obtaining sender information corresponding to an authenticated operator from a user management system after the operator is authenticated according to the authentication procedure, and utilizing the obtained sender information in image transmission. When sender information is not properly obtained, the operator sets sender information by himself or herself.

In the above-mentioned conventional apparatuses, when the operator sets sender information and transmits an image, the operator may set false sender information. Disadvantageously, it results in poor security.

SUMMARY OF THE INVENTION

The present invention provides an image communication apparatus, method, and program capable of overcoming the above-mentioned disadvantage.

The present invention prevents an operator from setting false sender information in image transmission.

The present invention rejects image transmission when sender information is inappropriate.

According to an aspect of the present invention, an image communication apparatus includes: an authentication unit for verifying a password entered by an operator against authentication information stored in a predetermined storage to authenticate the operator; a reader for reading sender information corresponding to the operator from the predetermined storage when the authentication unit authenticates the operator; and a transmitting unit for transmitting image data using the sender information when the sender information read by the reader is appropriate and prohibiting transmission of the image data when the sender information read by the reader is inappropriate.

In accordance with an aspect of the present invention, the transmitting unit transmits the image data by electronic mail. The sender information includes an electronic mail address of a sender. The transmitting unit sets a from field indicating the source of an electronic mail to the electronic mail address of the sender included in the sender information.

In accordance with another aspect of the present invention, the transmitting unit transmits the image data by File Transfer Protocol. The sender information includes an encryption key of a sender. The transmitting unit encrypts the image data using the encryption key of the sender.

In accordance with yet another aspect of the present invention, if the sender information read by the reader is inappropriate, the operator is prevented from transmitting but the operator is permitted to execute a non-transmission function in the image communication apparatus.

In accordance with yet another aspect of the present invention, the predetermined storage is included in the image communication apparatus. Alternatively, the predetermined storage may be connected to the image communication apparatus via a network.

In accordance with still another aspect of the present invention, the image communication apparatus may also include: a memory card reader for reading information stored in a detachable memory card, wherein the predetermined storage includes a respective detachable memory card.

According to another aspect of the present invention, an image communication method includes the steps of: verifying a password entered by an operator against authentication information stored in a predetermined storage to authenticate the operator; reading sender information corresponding to the operator from the storage when the operator is authenticated; determining if the sender information is appropriate; and if the sender information is appropriate, transmitting image data with the sender information.

According to yet another aspect of the present invention, a computer readable program, stored in a storage medium, includes the steps of: verifying a password entered by an operator against authentication information stored in a predetermined storage to authenticate the operator; reading sender information corresponding to the operator from the storage when the operator is authenticated; determining if the sender information is appropriate; and if the sender information is appropriate, transmitting image data with the sender information.

Further features and advantages of the present invention will become apparent from the following description of the preferred embodiments with reference to the attached drawings.

BRIEF DESCRIPTION OF THE DRAWINGS

FIGS. 6A to 6C show authentication information and sender information stored in three integrated circuit (IC) cards.

FIG. 7 is a flowchart of a process of authentication and File Transfer Protocol (FTP) transmission, the process being executed by a central processing unit according to the third embodiment.

DESCRIPTION OF THE PREFERRED EMBODIMENTS

Embodiments according to the present invention will now be described hereinbelow with reference to the drawings.

First Embodiment

Figure 1:
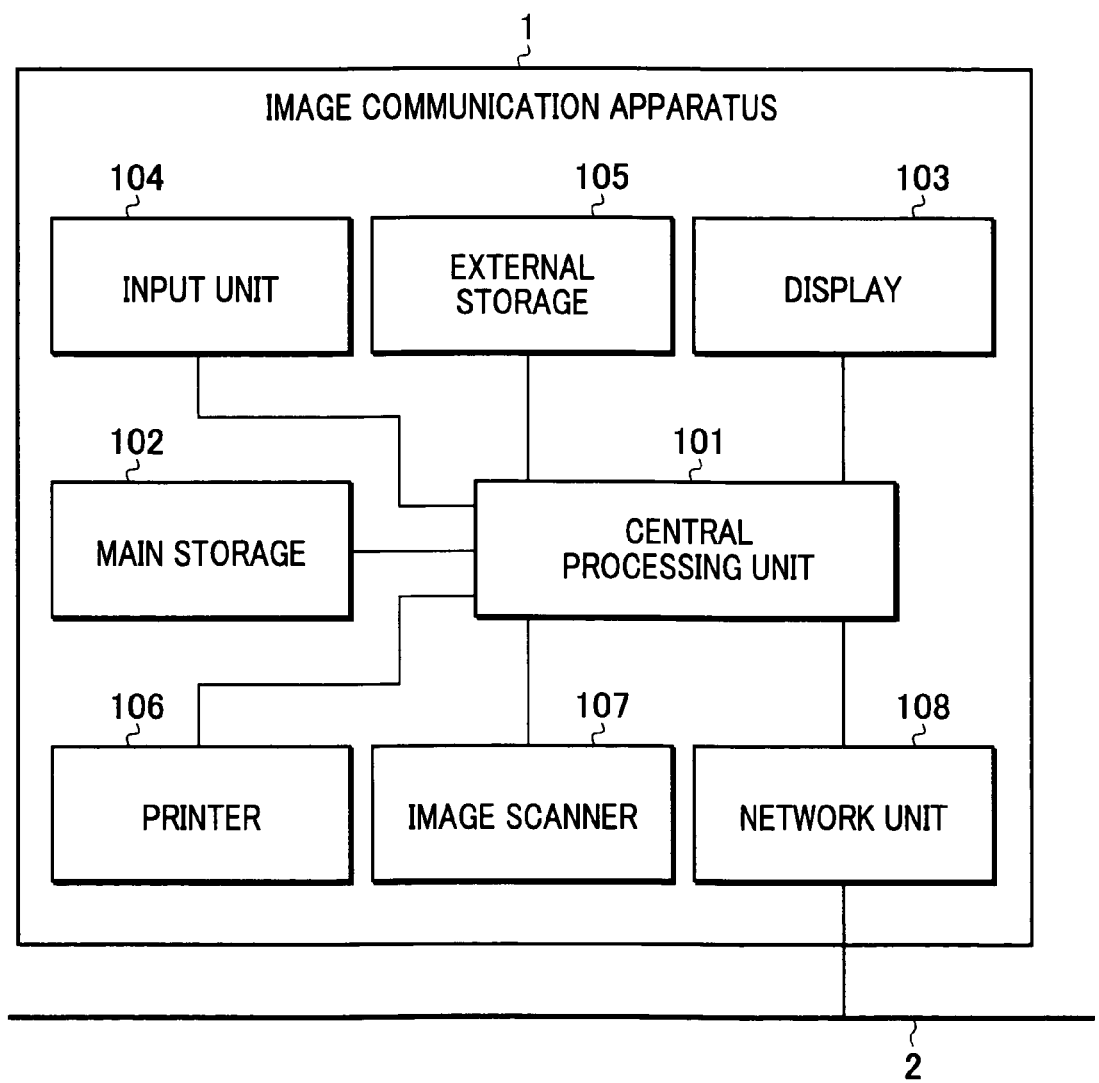
FIG. 1 is a block diagram of the structure of an image communication apparatus according to a first embodiment of the present invention.

FIG. 1 shows a block diagram of the structure of an image communication apparatus 1 according to a first embodiment of the present invention. The image communication apparatus 1 includes at least an image scanning function, an image storing function, an image forming (printing) function, and an image transmitting function.

Referring to FIG. 1, the image communication apparatus 1 primarily includes a central processing unit 101, a main storage 102, a display 103, an input unit 104, an external storage 105, a printer 106, an image scanner 107, and a network unit 108. The central processing unit 101 controls the main storage 102, the display 103, the input unit 104, the external storage 105, the printer 106, the image scanner 107, and the network unit 108. The central processing unit 101 also performs arithmetic operations and logical operations. The main storage 102 stores information necessary for information processing of the central processing unit 101. The central processing unit 101 can extract information from the main storage 102 as necessary.

The display 103 includes a touch panel display and displays graphic information and text information obtained from data processed through the central processing unit 101. The input unit 104 includes a keyboard and a touch panel for inputting various data to the central processing unit 101. The external storage 105 includes a magnetic storage or a magneto-optical storage for storing various information. The external storage 105 can store image data obtained through the image scanner 107.

The image communication apparatus 1 is connected to a network 2 via the network unit 108. After the central processing unit 101 reads data of an image scanned through the image scanner 107, the read image data can be transmitted to a host computer by electronic mail (e-mail) or File Transfer Protocol (FTP). The host computer is connected to the image communication apparatus 1 via the network 2. Alternatively, the read image data can be temporarily stored in the external storage 105 and then be transmitted to the host computer by e-mail or FTP. The network 2 includes Ethernet, a universal serial bus (USB), a serial connection network, and a parallel connection network.

The image communication apparatus 1 also has a copy function for outputting the data of the image, scanned through the image scanner 107, using the image scanning function and the image forming function, to form an image through the printer 106.

The external storage 105 stores image data obtained through the image scanner 107 and also holds authentication information for each operator. The authentication information is used to authenticate the operator. A login name and a password, entered from the input unit 104 by the operator, are verified against stored authentication information for the operator, so that the operator can be authenticated with reliability. The external storage 105 also holds sender information for each operator.

Figure 2:
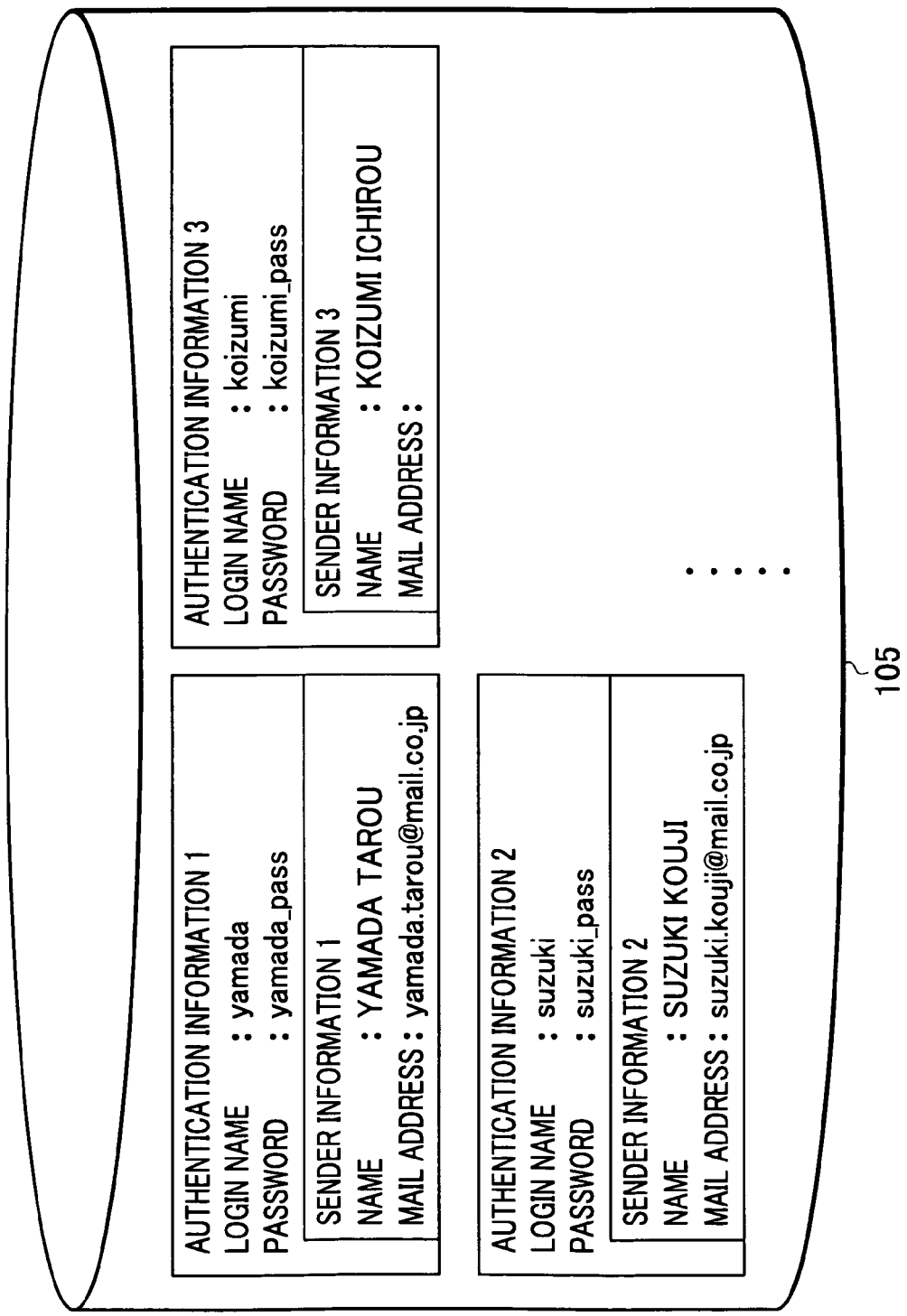
FIG. 2 shows an example of authentication information and sender information stored in an external storage.

FIG. 2 shows an example of authentication information and sender information stored in the external storage 105 of the image communication apparatus 1 according to the first embodiment.

The external storage 105 holds login names and passwords as authentication information. When operating the image communication apparatus 1, the operator enters his or her own login name and password, which only the operator knows, using the input unit 104. According to an authentication procedure, the entered login name and password are verified against authentication information stored in the external storage 105 to authenticate the operator, namely, to determine whether the operator is permitted to operate the present apparatus.

The external storage 105 also holds sender information, comprising a name and an e-mail address, for each operator such that the sender information corresponds to the authentication information in a one-to-one relationship. The sender information corresponding to the authenticated operator is read from the external storage 105 and is then attached to an e-mail in e-mail transmission. A process of authentication and e-mail transmission will be described in detail later with reference to FIG. 3.

At least one operator has authority to manage information. Authentication information and sender information in the external storage 105 is registered and edited by the operator that has authority to manage information. The other operators (that do not have authority to manage information) request the authority-invested operator to register or edit information.

Figure 3:
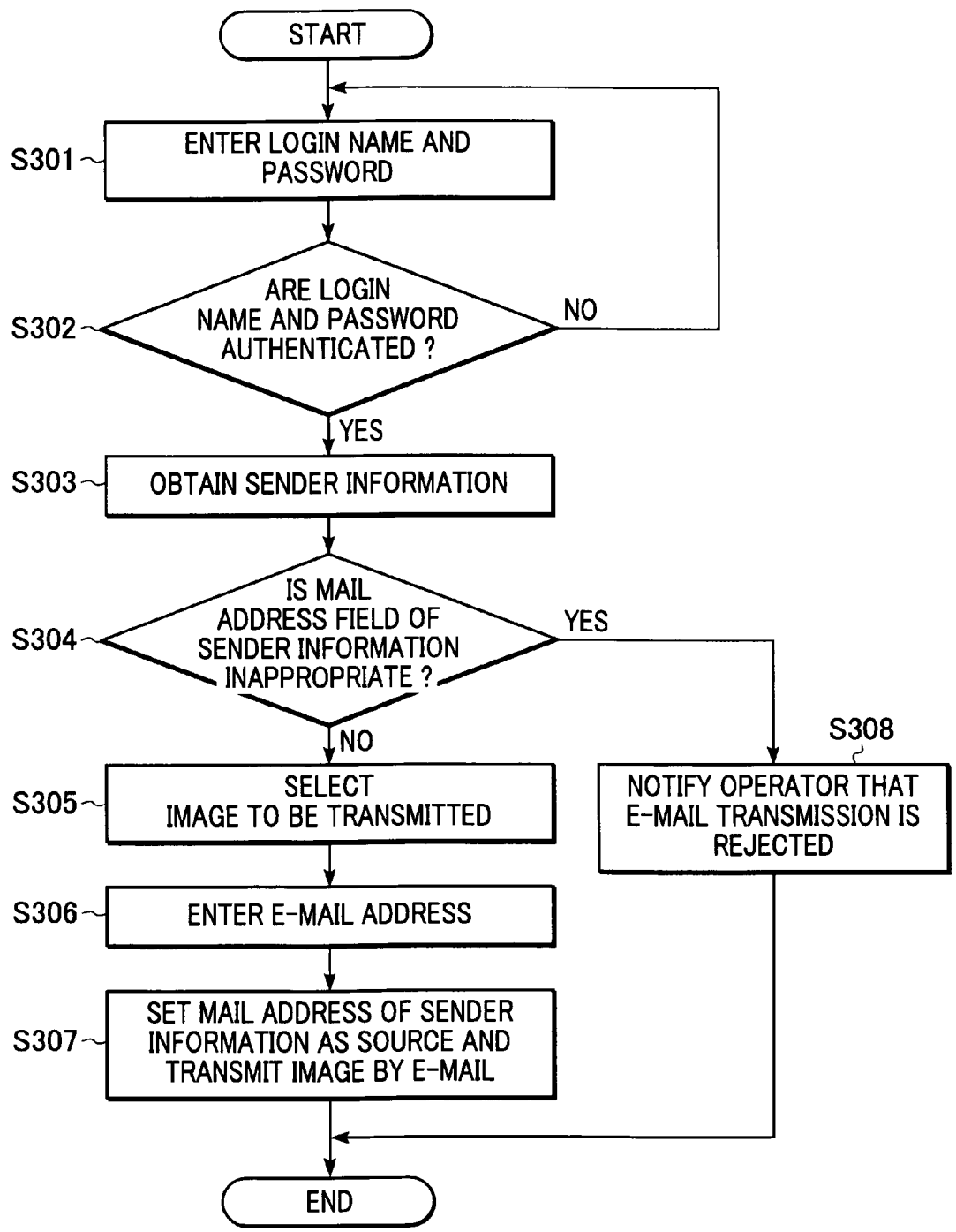
FIG. 3 is a flowchart of a process of authentication and electronic mail transmission, the process being executed by a central processing unit according to the first embodiment.

FIG. 3 is a flowchart of the process of authentication and e-mail transmission, the process being executed by the central processing unit 101 according to the first embodiment.

In step S301, a login name and a password, entered by the operator using the input unit 104, are accepted. In step S302, it is determined whether the entered login name and password are valid based on authentication information (refer to FIG. 2) stored in the external storage 105. If the entered login name and password are authenticated (yes in step S302), the process proceeds to step S303. If not (no in step S302), the process is returned to step S301. The operator may only be allowed a predetermined number of login attempts. If a valid login/password combination is not entered within the predetermined number of login attempts, the process ends.

In step S303, on the basis of the login name and password verified in step S302, sender information corresponding to the authentication information is obtained from sender information (refer to FIG. 2) stored in the external storage 105. In step S304, it is determined whether an e-mail address included in the obtained sender information is inappropriate. For example, referring to FIG. 2, an e-mail address field of sender information 3 is blank. Accordingly, it is determined that this e-mail address is inappropriate. According to the present embodiment, whether sender information is inappropriate is determined on the basis of whether the e-mail address field is blank. In addition, for example, if a character string in the e-mail address field is different from an e-mail address format such as *@*.com, it can be determined that the sender information is inappropriate.

If it is determined that the e-mail address is inappropriate (e.g., blank) (yes in step S304), the process proceeds to step S308. In step S308, the operator is notified that e-mail transmission is rejected, e.g., by displaying an error message in the display 103. If the mail address of the sender is inappropriate, the operator cannot perform e-mail transmission. However, the operator is authenticated in step S302. Accordingly, a function executed without sender information, for example, a copy function may be available.

On the other hand, if it is determined that the e-mail address is appropriate (no in step S304), the process proceeds to step S305. In step S305, the operator selects image data to be transmitted by e-mail from image data stored in the external storage 105. In step S306, the operator enters a destination e-mail address through the input unit 104. In step S307, a destination address ("To" field) is set to the e-mail address entered in step S306 and the image data selected in step S305 is attached to the e-mail to be transmitted. The e-mail address, which is obtained in step S303 and is determined as an appropriate address in step S304, is set in a "From" field indicating the source of the e-mail. The e-mail is then transmitted.

As mentioned above, according to the first embodiment, the image communication apparatus can prevent the operator from setting false sender information in image transmission.

Second Embodiment

A second embodiment of the present invention will now be described.

The structure of an image communication apparatus according to the second embodiment is fundamentally the same as that of the first embodiment. Therefore, in the description of the second embodiment, the same components as those of the first embodiment are designated by the same reference numerals and a description of the previously described components is omitted in the description of the second embodiment. Components different from those of the first embodiment are described below.

Figure 4:
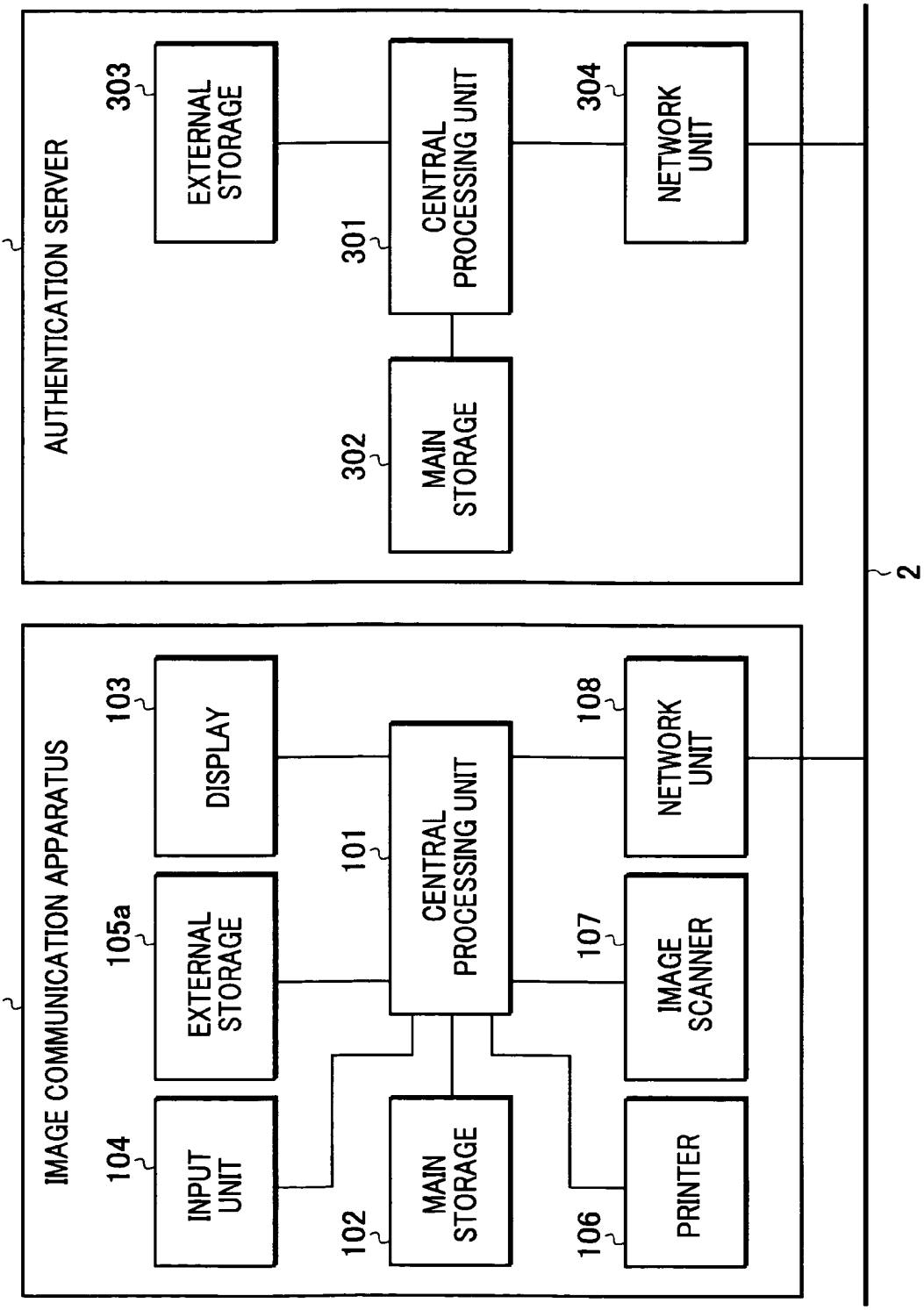
FIG. 4 is a block diagram of the arrangement of an image communication apparatus and an authentication server according to a second embodiment of the present invention.

FIG. 4 is a block diagram of the arrangement of an image communication apparatus and an authentication server according to the second embodiment.

According to the second embodiment, an external storage 105a stores image data scanned through an image scanner 107. The external storage 105a does not hold authentication information and sender information.

According to the second embodiment, an authentication server 3 is connected to a network 2. The authentication server 3 primarily includes a central processing unit 301, a main storage 302, an external storage 303, and a network unit 304. The central processing unit 301 controls the main storage 302, the external storage 303, and the network unit 304. The central processing unit 301 also performs arithmetic operations and logical operations. The main storage 302 stores information necessary for information processing of the authentication server 3. The central processing unit 301 can extract information from the main storage 302 as necessary. The external storage 303 includes a magnetic storage or a magneto-optical storage for storing various information. The external storage 303 holds authentication information and sender information for each operator.

According to the second embodiment, when a login name and a password are entered from an input unit 104 of an image communication apparatus 1, the login name and password are transmitted to the authentication server 3 via the network 2. In the authentication server 3, the central processing unit 301 authenticates the login name and password on the basis of authentication information stored in the external storage 303, reads out sender information corresponding to the authenticated operator from the external storage 303, and transmits the sender information to the image communication apparatus 1 via the network 2.

In the image communication apparatus 1, a central processing unit 101 receives the sender information and then executes the same processing steps as steps S304 to S308 in FIG. 3.

According to the second embodiment of the present invention, the image communication apparatus 1 has no authentication function. An authentication function is implemented in the authentication server 3 which is separated from the image communication apparatus 1.

Third Embodiment

A third embodiment of the present invention will now be described below.

The structure of an image communication apparatus according to the third embodiment is fundamentally the same as that according to the first embodiment. In the description of the third embodiment, therefore, the same components as those of the first embodiment are designated by the same reference numerals and the description thereof is omitted. Components different from those of the first embodiment are described below.

Figure 5:
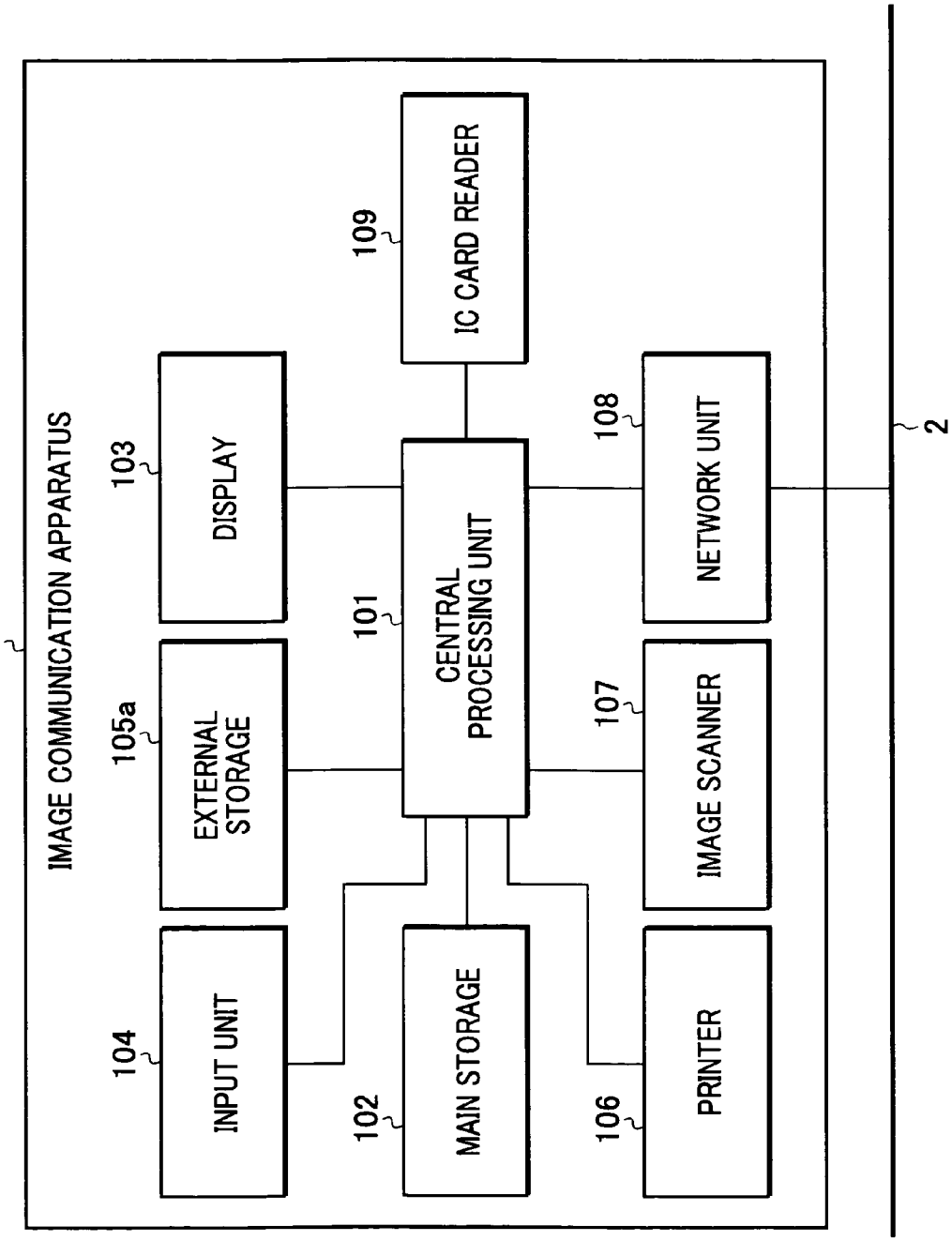
FIG. 5 is a block diagram of the structure of an image communication apparatus according to a third embodiment of the present invention.

FIG. 5 is a block diagram of the structure of an image communication apparatus 1a according to the third embodiment.

According to the third embodiment, the image communication apparatus 1a includes a central processing unit 101, a main storage 102, a display 103, an input unit 104, a printer 106, an image scanner 107, and a network unit 108. These components are the same as those in the first embodiment. The image communication apparatus 1a further includes an external storage 105a and an IC card reader 109.

The external storage 105a stores image data scanned through the image scanner 107 but does not hold authentication information and sender information.

The IC card reader 109 is designed such that an IC card can be externally inserted thereto. The IC card reader 109 reads information stored in the IC card. Authentication information and sender information of an IC card holder have been stored in each IC card. The sender information contains a secret key of the IC card holder.

In the image communication apparatus 1a, when authentication information is supplied from the input unit 104, the central processing unit 101 verifies the authentication information against authentication information stored in the IC card inserted in the IC card reader 109. When the operator is authenticated, the central processing unit 101 reads sender information (secret key) from the IC card to generate a digital signature. The generated digital signature is used in FTP transmission.

FIG. 6 illustrates authentication information and sender information stored in, for example, three IC cards according to the third embodiment.

Each IC card holds a login name and a password as authentication information and each IC card also holds a name and a secret key of the corresponding IC card holder as sender information.

At least one manager is authorized to manage IC cards. Only the authorized manager can register and edit authentication information and sender information in each IC card. Each general user requests the authorized manager to register authentication information and sender information into an IC card and then receives the resultant IC card.

FIG. 7 is a flowchart of a process of authentication and FTP transmission, the process being executed by the central processing unit 101 according to the third embodiment.

In step S701, it is determined whether an IC card is inserted in the IC card reader 109. If so (yes in step S701), the process proceeds to step S702. If not (no in step S701), the process is returned to step S701.

In step S702, the central processing unit 101 receives a password entered from the input unit 104. In step S703, it is determined whether the received password matches a password stored in the IC card inserted in the IC card reader 109. If so (yes in step S703), the process proceeds to step S704. If not (no in step S703), the process is returned to step S702.

In step S704, the central processing unit 101 obtains sender information from the IC card inserted in the IC card reader 109. In step S705, it is determined whether a secret key is contained in the obtained sender information. For example, referring to FIG. 6A, it is determined that sender information of an IC card 1 contains a secret key. Referring to FIG. 6C, it is determined that sender information of an IC card 3 does not include a secret key (a secret key is unregistered).

When it is determined that sender information does not include a secret key (a secret key is unregistered), the process proceeds to step S710. In step S710, the operator is notified that FTP transmission is rejected, e.g., by displaying an error message in the display 103. If the sender information does not include a secret key (a secret key is unregistered), the operator cannot perform FTP transmission. However, the operator is authenticated in step S703. Accordingly, a function implemented without sender information, for example, a copy function may be available.

On the other hand, if it is determined that sender information contains a secret key (no in step S705), the process proceeds to step S706. In step S706, image data to be transmitted by FTP is selected from image data stored in the external storage 105a. In step S707, a secret key is obtained from the IC card and a digital signature is generated on the basis of the secret key and the image data selected in step S706. In other words, the image data is encrypted using the secret key of the operator serving as a sender. To decrypt the encrypted image data on the receiving side, a public key of the sender is used. So long as the encrypted image data can be properly reconstructed using the public key, it is clear that the image data has been transmitted from the proper sender without being tampered.

In step S708, the operator enters a destination FTP folder name, an FTP user name, and an FTP password using the input unit 104. In step S709, the image data with the digital signature is transmitted to a destination FTP folder by FTP. The present process is then terminated.

As mentioned above, according to the third embodiment of the present invention, sender information of the IC card holder authenticated according to the authentication procedure can be identified using the IC card. Further, data is encrypted using a secret key contained in the sender information. Advantageously, operators other than the IC card holder cannot enter false sender information.

According to the first to third embodiments, the operator selects transmission image data from image data stored in the external storage 105 (or 105a). Image data of an original image scanned through the image scanner 107 can also be transmitted.

A storage medium, containing program code of software for implementing functions described in the above embodiments, may be provided to a system or an apparatus. The program code can be read from the storage medium through a computer such as a CPU or a micro-processing unit (MPU) of the system or apparatus. The program code can then be executed to realize the functions.

In this case, the program code, read from the storage medium, implements the functions according to the above embodiments.

The storage medium such as a floppy disk, a hard disk, a magneto-optical disk, a Compact Disk Read-Only Memory (CD-ROM), a Compact Disk—Recordable (CD-R), a Compact Disc—ReWritable (CD-RW), a Digital Versatile Disc Read-Only Memory (DVD-ROM), a Digital Versatile Disc Random Access Memory (DVD-RAM), a Digital Versatile Disc ReWritable (DVD-RW), a Digital Versatile Disk—Recordable (DVD-R), a magnetic tape, a nonvolatile memory card, or a Read-Only Memory (ROM) can be used for providing the program code.

In addition to the case where the program code read through the computer is executed to realize the functions according to the above-mentioned embodiments, the present invention further includes a case where an operating system (OS), running on the computer, performs a part or an entire process in accordance with instructions based on the program code to implement the functions according to the above embodiments.

Furthermore, the program code read from the storage medium may be written into a function expansion board inserted in the computer or a memory included in a function expansion unit connected to the computer, and a part or an entire process is executed through a CPU, included in the function expansion board or unit, in accordance with instructions based on the program code to realize the functions according to the above embodiments.

According to the embodiments mentioned above, authentication information and sender information of a plurality of operators are stored in a storage such that authentication information and sender information correspond to each operator in a one-to-one relationship. The operator, who designates image data to be transmitted, enters at least a password. The entered password is verified against authentication information stored in the storage. When the operator is authenticated, sender information corresponding to the operator is read from the storage. The image data designated by the operator is then transmitted by e-mail using the sender information.

Furthermore, in an image communication apparatus to which a memory card containing authentication information and sender information of the operators can be attached, the operator, who designates image data to be transmitted, enters at least a password. The entered password is verified against authentication information stored in the attached memory card to authenticate the operator. When the operator is authenticated, sender information corresponding to the operator is read from the attached memory card. The image data designated by the operator is encrypted using the sender information and is then transmitted by FTP.

Consequently, the operator cannot set false sender information in image transmission, resulting in the increase in reliability of sender information and security. In other words, it is difficult for a person to pose as an operator and transmit an image. Thus, security is retained.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image communication apparatus comprising:
    an external storage unit for storing authentication information and sender information for each of a plurality of operators;
    an authentication unit for verifying a password entered by an operator against authentication information stored in the external storage unit in order to authenticate the operator;
    a reader for reading sender information corresponding to the operator from the external storage unit when the authentication unit authenticates the operator, wherein the external storage unit is capable of storing the sender information corresponding to the operator before the operator is authenticated by the authentication unit;

a transmitting unit for transmitting image data to an external apparatus; a determining unit for determining whether the reader has read, from the external storage unit, appropriate sender information to be set for the image data transmitted by the transmitting unit; and a control unit for controlling the transmitting unit to transmit to the external apparatus the image data for which the appropriate sender information is set if the determining unit determines that the reader has read the appropriate sender information, and controlling the transmitting unit to restrict the transmission of the image data to the external apparatus if the determining unit determines that the reader has not read the appropriate sender information.

2. The image communication apparatus according to claim 1, wherein the transmitting unit transmits the image data by electronic mail.

3. The image communication apparatus according to claim 2, wherein the sender information includes an electronic mail address of a sender.

4. The image communication apparatus according to claim 3, wherein the transmitting unit sets a from field indicating the source of an electronic mail to the electronic mail address of the sender included in the sender information.

5. The image communication apparatus according to claim 1, wherein the transmitting unit transmits the image data by File Transfer Protocol.

6. The image communication apparatus according to claim 1, wherein if the authentication unit authenticates the operator but the determining unit determines that the reader has not read the appropriate sender information, the control unit permits execution of a non-transmission function in the image communication apparatus.

7. An image communication method comprising the steps of:

verifying a password entered by an operator against authentication information stored in an external storage unit in order to authenticate the operator, wherein the external storage unit stores the authentication information and sender information for each of a plurality of operators, and the external storage unit is capable of storing the sender information corresponding to the operator before the operator is authenticated;

reading the sender information corresponding to the operator from the external storage unit when the operator is authenticated;

determining whether appropriate sender information to be set for image data transmitted to an external apparatus has been read from the external unit;

transmitting, to the external apparatus, the image data for which the appropriate sender information is set if it is determined that the appropriate sender information has been read from the external storage unit; and restricting the transmission of the image data to the external apparatus if it is determined that the appropriate sender information has not been read from the external storage unit.

8. A computer readable storage medium having stored thereon a computer readable program causing a processor to execute the steps of:

verifying a password entered by an operator against authentication information stored in an external storage unit in order to authenticate the operator, wherein the external storage unit stores the authentication information and sender information for each of a plurality of operators, and the external storage unit is capable of storing the sender information corresponding to the operator before the operator is authenticated;

reading the sender information corresponding to the operator from the external storage unit the operator is authenticated;

determining whether appropriate sender information to be set for image data transmitted to an external apparatus has been read from the external storage unit;

transmitting, to the external apparatus, the image data for which the appropriate sender information is set if it is determined that the appropriate sender information has been read from the external storage unit; and restricting the transmission of the image data to the external apparatus if it is determined that the appropriate sender information has not been read from the external storage unit.

* * * * *